United States Patent [19]

Manulescu et al.

[11] Patent Number: 5,730,763
[45] Date of Patent: Mar. 24, 1998

[54] HEAT EXCHANGER AND APPARATUS FOR GASIFICATION AND/OR REFORMING

[75] Inventors: Mircea Tudor Manulescu, Sao Paolo, Brazil; Jean-Paul Vandenhoeck, Guilford, Conn.

[73] Assignee: Kortec AG, Switzerland

[21] Appl. No.: 758,953

[22] Filed: Dec. 2, 1996

Related U.S. Application Data

[62] Division of Ser. No. 371,589, Jan. 12, 1995, Pat. No. 5,580,362, which is a continuation of Ser. No. 856,059, Aug. 27, 1992, abandoned.

[51] Int. Cl.[6] ............................................. C10J 3/54
[52] U.S. Cl. ........................... 48/61; 48/62 R; 48/86 R; 48/87; 48/89; 48/113; 48/126; 422/139; 422/143; 165/104.16; 432/58
[58] Field of Search .................... 48/61, 62 R, 86 R, 48/87, 89, 113, 126; 422/139, 143; 165/104.16; 432/58, 136; 431/159

[56] References Cited

U.S. PATENT DOCUMENTS

| | | |
|---|---|---|
| 2,582,712 | 1/1952 | Howard . |
| 2,671,122 | 3/1954 | Goldtrap . |
| 2,714,059 | 7/1955 | Bearer . |
| 2,726,136 | 12/1955 | Davis . |
| 2,738,262 | 3/1956 | Benz et al. . |
| 2,772,954 | 12/1956 | Jequier . |
| 2,848,280 | 8/1958 | Pappas . |
| 3,573,224 | 3/1971 | Strelzoff et al. . |
| 3,957,459 | 5/1976 | Mitchell et al. . |
| 4,002,438 | 1/1977 | Fleming . |
| 4,094,651 | 6/1978 | Donath . |
| 4,268,412 | 5/1981 | Miyashita et al. . |
| 4,312,639 | 1/1982 | Johnson . |
| 4,443,229 | 4/1984 | Sageman et al. . |
| 4,444,569 | 4/1984 | Haas . |
| 4,451,184 | 5/1984 | Mitchell . |
| 5,568,776 | 10/1996 | Suraniti et al. ............... 422/143 |

FOREIGN PATENT DOCUMENTS

| | | |
|---|---|---|
| 0009456 | 2/1980 | European Pat. Off. . |
| 0191522 | 8/1986 | European Pat. Off. . |
| 2333852 | 1/1977 | France . |
| 1808911 | 7/1969 | Germany . |
| 1542055 | 3/1970 | Germany . |
| 2947128 | 4/1980 | Germany . |
| 2945064 | 5/1981 | Germany . |
| 2759823 | 2/1984 | Germany . |
| 37 24 947 | 2/1989 | Germany . |

*Primary Examiner*—Timothy McMahon
*Attorney, Agent, or Firm*—Bell Seltzer Intellectual Property Law Group of Alston & Bird LLP

[57] ABSTRACT

The invention relates to a process and an apparatus for gasifying liquid and/or fine-grain solid gasification substances and/or for reforming a gas, using a gasification agent, in a reaction (1). In the process the process heat is supplied by heat carrier particles which are heated within a substantially closed circuit in a heater (5) by combustion gases which are produced in a combustion chamber (3), and passed through the reactor (1) in counter-flow relationship with the gasification substance or the gas to be reformed and the gasification agent, and then returned to the heater (5) for renewed heating. In accordance with the invention the particles and the combustion gas form a fluidized bed above at least one grid (34, 34a, 34b, 34c, 34d, 34e) arranged in the heater (5). The particles flow out of the heater (5) into the adjoining combustion chamber (3) in which they form a fluidized bed with the combustion gas and pass by way of a flow transfer pipe (7, 7') out of the combustion chamber (3) into an upper region of the reactor (1). The throughput of particles through the flow transfer pipe (7, 7') forms a seal which prevents a throughflow of product gas which is generated in the reactor (1). The particles form one or more fluidized beds in the reactor (1) with the gasification substance and/or the gas to be reformed.

17 Claims, 7 Drawing Sheets

HEAT EXCHANGER AND APPARATUS FOR GASIFICATION AND/OR REFORMING

This application is a divisional of U.S. Ser. No. 08/371,589, filed Jan. 12, 1995, now U.S. Pat. No. 5,580,362; which is a continuation of Ser. No. 07/856,059, filed Aug. 27, 1992, and now abandoned.

FIELD OF THE INVENTION

The invention relates to a process for gasifying liquid and/or fine-grain solid gasification substances and/or for reforming a gas, adding a gasification agent in a reactor.

The invention further relates to an apparatus for carrying out the process.

BACKGROUND OF THE INVENTION

In a known process (British patent specification No 744 742) for gasifying a fine-grain gasification material and/or for reforming a carbon dioxide-bearing gas to provide a carbon monoxide-bearing gas, the reactor is supplied with the heat required for the chemical reaction to take place, by way of fine-grain heat-carrier particles which are passed in a closed circuit and which are heated outside the reactor. In the case of particles which are conveyed in counter-flow relationship, the endeavour is to achieve good distribution of the particles in the reactor and thus good transfer of heat between the particles and the gasification substance, by virtue of the reactor being arranged horizontally and rotated about its longitudinal axis. Particles which reach the bottom of the reactor are lifted by the rotary movement in order then to fall back to the bottom of the reactor, due to their own weight; that arrangement is intended to cause the interior of the reactor to be acted upon by the particles, in a similar manner to a trickle flow therewithin, in order to give a good heat exchange effect. For particles which move in co-flow relationship, it is proposed that they are conveyed from an upper region of a vertically disposed reactor through a layer of fine-grain solid gasification substances to the bottom of the reactor from which they are discharged together with any ash which is produced.

The particles consist of metals or metal oxides and are about between 1 and 5 mm in grain size. Any ash which is discharged by way of the particles is separated out before the particles are recycled to the heater, for example by sieving or by magnetic separation of ash components. The heater provided for heating the particles likewise comprises a heater cylinder which rotates about its longitudinal axis; the aspect of the supply of heat to the heater is not discussed in detail. The particles which are heated in the heater are passed to the heater again, within the closed circuit, after they issue from the reactor by way of a coking device or an air preheater. When gasifying substances in dust form, they can assume a floating condition within the reactor, in a manner which is not described in further detail.

The use of a rotating reactor and also a rotating heater means that the level of expenditure involved in carrying the process into effect is relatively high. A corresponding level of expenditure is required for constructing and maintaining an apparatus for carrying out the process. In addition, there is no guarantee of intimate mixing with the gasification substance, either when the particles pass with a trickle flow through the gasification substance when the reactor rotates, or when a layer of the gasification material within a rotating reactor is acted upon by downwardly moving particles, so that the level of efficiency in terms of heat exchange is relatively low.

In a known process for reforming of gases containing $CO_2$ and $H_2O$, and hydrocarbon-bearing gases to provide reduction gases with a high $H_2$ and CO component (German patent specification No 2 947 128), the heat transfer medium used is fluidisable heat-resistant particles, for example of aluminium oxide, of a particle size in the range of between 50 and 500 µm. There is no provision therein for gasification of liquid or solid gasification substances. For the purposes of reforming gases, the particles which circulate in a closed circuit firstly absorb in the heater and in the combustion chamber, the heat of combustion gases which are produced in the combustion chamber. For that purpose the particles are held in a fluidised bed which is formed with the combustion gas, both in the heater and also in the combustion chamber, in each case above a respective grid. In that situation they pass by way of a down pipe from the heater into the combustion chamber from which they pass by way of a further down pipe into a bottom chamber which is disposed beneath the combustion chamber. The bottom chamber is connected by way of a conveyor pipe to the upper region of the reactor in which the particles are received above grids in fluidised beds formed with the gas to be reformed. The fluidised beds produced in the reactor are likewise connected by way of a down pipe. In order to prevent reduction gas produced in the reactor from passing into the bottom chamber or the combustion chamber, arranged in the conveyor pipe is a double-acting valve which is to open or close alternately. The double-acting valve provides on the one hand that particles are discontinuously fed to the reactor while on the other hand it means that the structure and operation of the apparatus for carrying out the process are relatively expensive and involve an increased amount of wear and accordingly also an increased susceptibility to trouble.

SUMMARY OF THE INVENTION

The invention is based on the object of so developing a process of the general kind set forth that in an effective, simple and operationally reliable manner, it can provide for the absorption of heat by the particles and the delivery of heat to gasification substances and/or gases to be reformed and gasification agent in the reactor. The invention is further based on the object of developing an apparatus of the general kind set forth for carrying out the process and comprising a high temperature heat exchanger of a relatively simple, wear-resistant and operationally reliable structure which permits heat exchange with a high level of efficiency.

In accordance with the invention, the object is attained in a process for gasifying liquid and/or fine-grain solid gasification substances and/or for reforming a gas, adding a gasification agent, in a reactor to which the process heat is supplied by heat carrier particles, the process comprising the steps of:

heating the heat carrier particles within a substantially closed circuit in a heater by combustion gases produced in a combustion chamber;

passing the heat carrier particles through the reactor in counter-flow relationship to the gasification substance or the gas to be reformed and the gasification agent;

returning the particles to the heater for renewed heating;

forming a fluidized bed of the particles and the combustion gas above at least one grid arranged in the heater while the particles flow out of the heater into an adjoining combustion chamber in which they form a fluidized bed with the combustion gases; and passing the particles by way of a flow transfer pipe out of the combustion chamber into an upper region of the reactor wherein the throughput through the flow transfer pipe forms a seal which prevents a throughflow of product gas generated in the reactor and the particles form the one or more fluidized beds in the reactor with the gasification substance and/or the gas to be reformed.

The apparatus according to the present invention comprises:

a heater, a combustion chamber and a reactor each arranged in substantially vertical direction;

said heater arranged above said combustion chamber and directly adjoining same, said heater comprising at least one grid and a distributor in the upper region of said heater for distributing heat carrier particles;

fuel nozzles distributed over the periphery of said combustion chamber in the lower region thereof;

combustion air nozzles distributed over the periphery of said combustion chamber beneath said fuel nozzles;

a flow transfer pipe connected between said combustion chamber and said reactor, said flow transfer pipe including an inlet opening being arranged in the region of said fuel nozzles and an outlet arranged in the upper region of said reactor; and a distributor device associated with the outlet opening of the flow transfer pipe, adjacent and at a spacing from the outlet opening for distributing the particles.

A high temperature heat exchange according to the present invention for heat exchange between solid particles and a fluidizing agent in a fluidized bed comprises a vessel having at least one grid, said grid having through holes for supplying the fluidizing gas, said grid being formed from substantially hexagonal ceramic elements, each of which comprises a support element and a plate-like cover element which lies thereon.

The fact that the particles and the combustion gas form a fluidised bed above at least one grid disposed in the heater results, within the heater, in intimate mixing between the particles and the combustion gas, which results in good heat exchange. Heat exchange or heating of the particles to the necessary temperature of 1250° C. takes place in a fluidised bed in the heater, the lower portion of which is in the form of a combustion chamber in which the combustion gases are at a temperature of between 1350° C. and 1500° C. In accordance with the invention the particles which are heated in the heater and in the combustion chamber pass by way of a flow transfer pipe from the combustion chamber into an upper region of the reactor. The throughput of material through the flow transfer pipe forms a seal which prevents a throughflow of product gas which is produced in the reactor. Thus, with a low level of expenditure in regard to carrying the process into effect and in a manner which involves a low level of wear and which is thus operationally reliable, in accordance with the invention a throughflow of product gas is prevented, without for example any need to provide a double-acting valve which has to be opened and closed alternately as a sealing member, and actuated during operation of the process.

The particles passing into the reactor there form with the gasification substance and/or the gas to be reformed a number of fluidised beds corresponding to the number of grids; that ensures in the reactor a good heat exchange effect which enhances the level of effectiveness of the process.

Advantageously, the throughput of particles through the flow transfer pipe is adjustable so that the operating procedure can be influenced in a simple fashion by varying the particles which are fed to the reactor, and therewith also the amount of heat.

It has further been found to be advantageous for solid gasification substances to be conveyed into a feed or entry chamber in which they are picked up by a conveyor gas and passed therewith to the reactor by way of at least one feed pipe. That ensures in a simple and effective fashion that the gasification substances are substantially uniformly distributed in a fluidised bed which is built up in the reactor and which results in a good heat exchange effect.

In that connection it is advantageous for fluidised beds which are disposed in succession to be formed in the reactor above the reactor bottom adjacent the feed chamber, and one or more grids. That gives rise to good conditions for fast and complete performance of the chemical reactions which result in a gasification or reforming effect, and also uniform heating, which is advantageous in that respect, by the particles. In that way the mixing effect which is required for gasification or reforming, in respect of the particles with the gasification agent and substance and/or reforming gas for transport of heat and material, can take place more quickly and more completely.

In a preferred embodiment agglomerated particles and/or particles with ash clinging thereto are removed from the combustion chamber by way of a closable discharge pipe. In a simple fashion, that permits particles which are no longer operational in regard to the formation of a fluidised bed to be removed as required from the particle circuit. In that way the level of effectiveness of the process and also the operational reliability thereof can be further improved in a simple fashion.

In another preferred embodiment, a control gas which is for example an inert gas can be supplied by way of control nozzles to a portion adjacent to an outlet opening of the flow transfer pipe, in order to increase the throughput speed through the flow transfer pipe, by way of an injection action. The supply of heat to the reactor and thus the operating procedure of the process can be influenced in a simple manner in that way, by virtue of a variation in the speed of throughput through the flow transfer pipe.

The solid gasification substances which can be used are fine-grain pit coal, brown coal or lignite, peat, charcoal or biomass and/or the liquid gasification substances which may be used are light or heavy hydrocarbons and alcohols. The gasification agents that may be used can be any $H_2O$ and any $CO_2$-bearing substances such as for example steam, water vapour-bearing gases, and $CO_2$-bearing waste gases such as blast furnace gas or the like.

The gas to be reformed, that may be used, is gaseous hydrocarbons such as for example natural gas.

In order for the process to be carried out effectively, it has been found advantageous for the combustion gases in the combustion chamber to reach a temperature of between about 1350° C. and 1500° C.

It has also been found advantageous for water vapour or steam to be added directly to the reactor, as a gasification agent. That gives good distribution of the gasification agent within the reactor, as a necessary condition for effective gasification.

It is advantageous for an increased pressure to be formed in the reactor, relative to the heater or the air preheater. The increased pressure ensures in a simple fashion that no oxygen-bearing hot combustion gases can pass from the combustion chamber into the reactor, where they could result in combustion which would endanger operational safety. In a corresponding fashion, that ensures that preheated combustion air cannot flow into the reactor.

For the purposes of carrying the process into effect, it has been found advantageous to use particles of a substantially spherical shape of a diameter in a range of between about 0.5 mm and 3 mm. The particles preferably comprise an oxide, for example aluminium oxide.

In the apparatus according to the invention for carrying out the process, the heater, combustion chamber and reactor are each arranged substantially in a vertical direction. That ensures in a simple fashion that particles can be conveyed within the individual vessels due to the force of gravity acting on them; there is therefore no need for example for a heater or reactor to be caused to rotate in order to convey the particles. Furthermore, the particles can be conveyed by the force of gravity between individual vessels, by virtue of a suitable arrangement thereof.

The fact that in accordance with the invention the heater is disposed above the combustion chamber immediately adjoining same and has at least one grid, and in its upper region has a distributor for the particles, ensures in a simple fashion that particles which are uniformly distributed in the heater pass into the combustion chamber due to the force of gravity acting thereon. In that arrangement, grids may be formed from high-grade steel in a region which is further away from the combustion chamber; grids which are arranged adjacent the combustion chamber are made from ceramic elements in order to be able to withstand the high temperatures of the combustion gases. To provide for the advantageous formation of thin fluidised beds of a height of about 100 mm above a grid, it is advantageous for the grids to have a substantially flat surface which is substantially maintained even after thermal expansion has occurred. For that purpose, the ceramic elements can be designed to engage one into the other and can be supported relative to each other and/or relative to an outside wall of the heater by way of springs. Making the grids from ceramic elements or high-grade steel also means that the amount of wear from which the grids suffer is slight, in spite of the formation of fluidised beds within which the particles are moved at a high speed.

The fact that fuel nozzles are arranged in a lower region of the combustion chamber, distributed around its periphery, while combustion air nozzles are disposed therebeneath, also distributed around its periphery, ensures that the combustion gas produced is distributed and caused to flow in such a way that the particles form a fluidised bed in the combustion chamber with the combustion gas.

In accordance with the invention the inlet opening of the flow transfer pipe is arranged in the region of the fuel nozzles. That arrangement ensures that sufficient particles continuously pass from the fluidised bed formed in the combustion chamber into the flow transfer pipe in which they form a seal relative to the product gas produced in the reactor and carry a sufficient amount of heat to the reactor. In order further to promote the intake of particles into the flow transfer pipe, the inlet opening may be of a funnel-shaped enlarged configuration at least in a region-wise fashion.

In accordance with the invention a distributor device for distributing the particles is associated, at a spacing, with the outlet opening of the flow transfer pipe, which opening projects into the upper region of the reactor. The distributor device which is formed for example from a baffle plate results in uniform distribution of the hot particles passing into the reactor.

In accordance with the invention, associated with the reactor is an entry or feed chamber which is connected to the reactor by way of at least one feed conduit and which has a lower chamber with a connecting conduit for a conveyor gas and an upper chamber which is arranged above the lower chamber and which is separated therefrom by a porous partition, the upper chamber having a connecting conduit for gasification substance. In a simple fashion, that arrangement provides the necessary condition for the solid gasification substances which are introduced into the reactor, after passing into the reactor, being picked up quickly and in a substantially uniformly distributed fashion in the fluidized bed which is formed in the reactor and which contains the particles.

In a preferred embodiment, the distributor device is an orifice plate associated with the flow transfer pipe and/or a distributor plate which can be supplied by way of the outlet opening or the orifice plate. The arrangement of the orifice plate provides that the particles flowing out of the outlet opening are divided into a main component which passes through the orifice plate and a smaller, diverted component. That provides for good distribution of the particles in the upper region of the reactor. Distribution can be further improved by a distributor plate being so arranged that it is acted upon by the main component of the particles, which flows through the orifice plate.

In another preferred embodiment, at least one control nozzle connected to a control gas conduit is associated with a region of the flow transfer pipe, which is adjacent to the outlet opening. By suitably supplying a gas such as an inert gas as the control gas, by way of the injection effect which is produced thereby in the flow transfer pipe, it is possible to vary the throughput of particles through the flow transfer pipe in a simple fashion in order to influence the operating procedure involved in the process.

In the heater as well as in the reactor heat exchange takes place between the particles and a gas in a fluidized bed at high temperatures. Heater and reactor are therefore high temperature heat-exchangers which make possible by the configuration of their grids with a relatively simple, wear-resistant and operationally reliable structure a heat exchange with a high level of efficiency. This high temperature heat exchanger is not only applicable as a part of the apparatus according to the invention but in an universal manner.

BRIEF DESCRIPTION OF THE DRAWINGS

An embodiment of the apparatus according to the invention is described with reference to the drawing with an example of the operating procedure according to the invention. In the drawings which are diagrammatic simplified views.

DETAILED DESCRIPTION OF THE PREFERRED EMBODIMENTS

Figure 1:
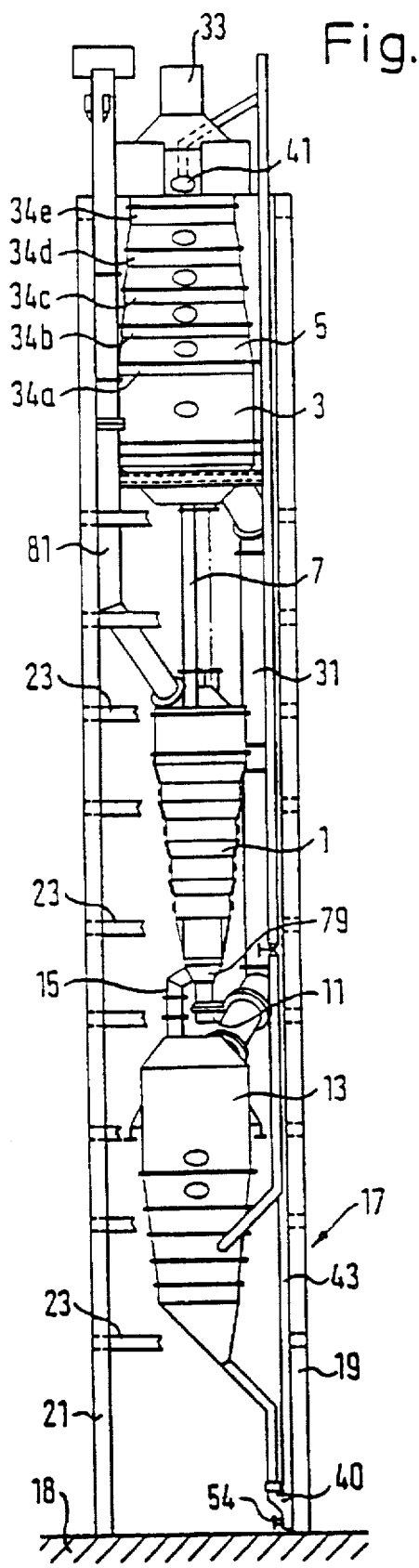
FIG. 1 shows an apparatus for carrying out the process.

The apparatus shown in FIG. 1 for carrying out the process according to the invention for gasifying liquid and/or fine-grain solid gasification substances and/or for reforming a gas, using a gasification agent, has a reactor 1 which is arranged vertically substantially in the middle of the apparatus. Disposed above the reactor 1 is a heater 5 which is in the form of a vessel or container and the lower region of which is in the form of a combustion chamber 3. So that heat carrier particles which are heated in the heater 5 and the combustion chamber 3, in the manner described hereinafter, can pass into the reactor 1, a flow transfer pipe 7 extends from the lower region of the combustion chamber 3 into the upper region of the reactor 1 (see FIG. 9).

Figure 10:
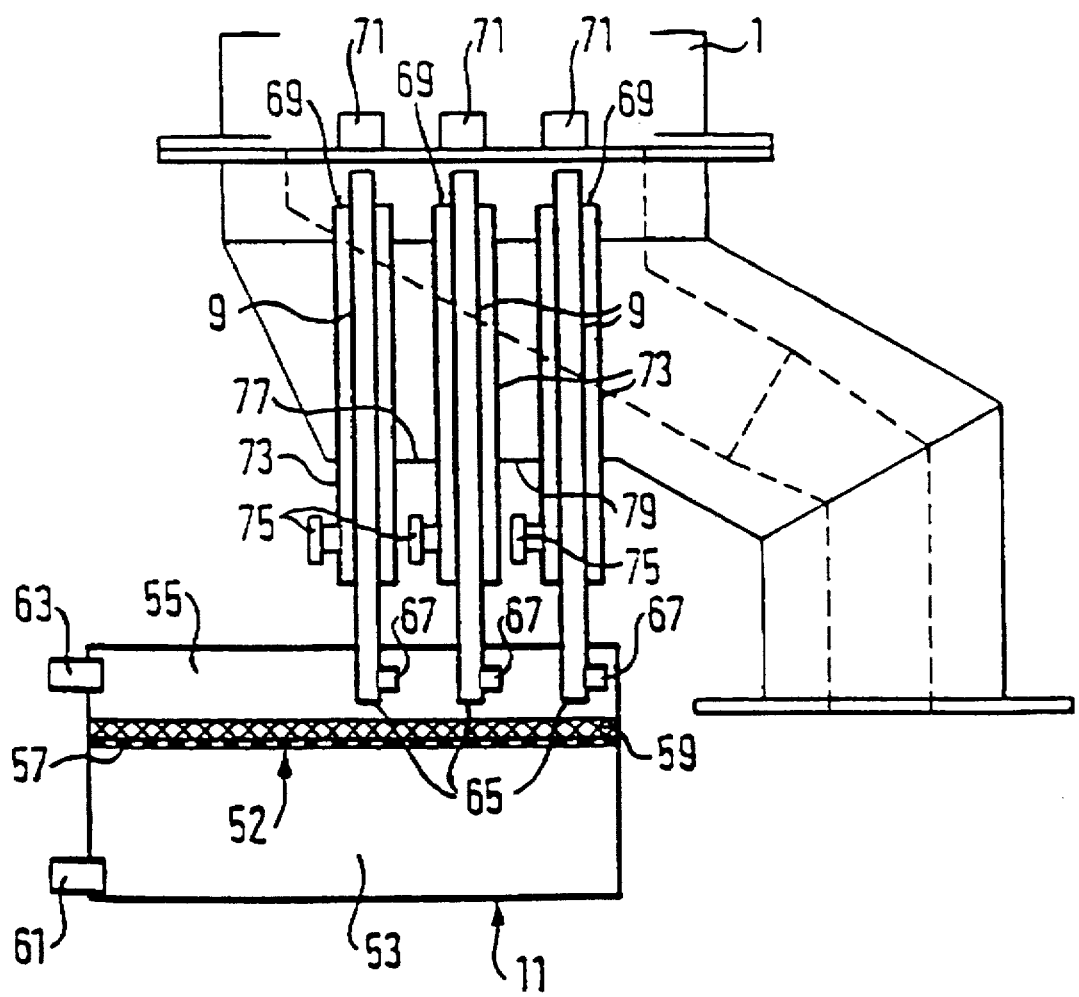
FIG. 10 is a view in section through the lower region of the reactor and an associated feed chamber for the apparatus shown in FIGS. 1 and 2.

For the purposes of supplying and loading gasification substances, the assembly includes a storage container (not shown) from which for example solid, fine-grain gasification substances are fed in a metered fashion to an entry or feed chamber 11 which is arranged beneath the reactor and which is connected to the lower region of the reactor 1 by way of a plurality of feed pipe 9. The illustrated embodiment has seven feed pipes 9, of which FIG. 10 shows a row with three feed pipes 9.

Disposed beneath the reactor 1 is an air preheater 13 which is connected to the reactor 1 by way of a return conduit 15. In a corresponding manner to the combustion chamber 3 and the heater 5, the reactor 1 and the air preheater 13 are each also in the form of a container and are secured to a support frame which is generally identified by reference numeral 17.

The support frame is in the form of a steel structure and has for example four longitudinal columns of which FIG. 1 shows the front two columns 19 and 21. At various positions in respect of height, the columns 19 and 21 are connected together by transverse struts 23. The support frame 17 is fixedly anchored to a good region 18 by way of a foundation in a manner which is not further shown herein.

Figure 9:
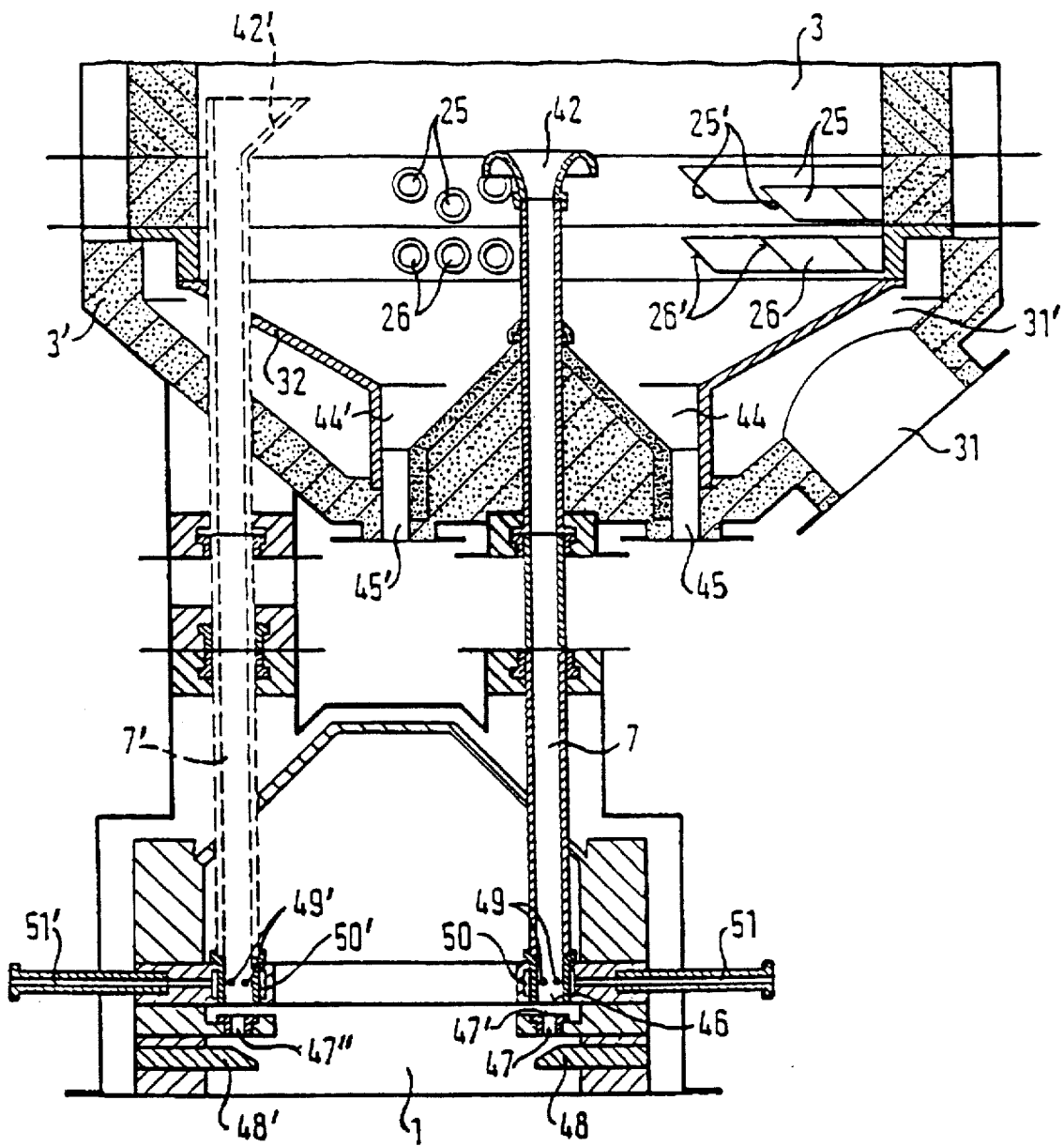
FIG. 9 is a view in section through the lower region of a combustion chamber and the upper region of a reactor of an apparatus as shown in FIG. 1.

As can be seen from FIG. 9, arranged in the lower region of the combustion chamber 3 in two adjacent horizontal planes, and distributed around the periphery of the combustion chamber 3, are fuel nozzles 25 for the feed of fuel. In that arrangement, fuel nozzles 25 which are disposed in one plane are arranged in displaced relationship in the peripheral direction relative to the fuel nozzles 25 disposed in the adjacent plane. Combustion air nozzles 26 are arranged beneath the fuel nozzles 25 and adjacent thereto, also distributed around the periphery, in one plane. The distribution of the fuel nozzles 25 and the combustion air nozzles 26 at the periphery is such that in the present case a combustion air nozzle 26 is associated with each fuel nozzle 25. The fuel nozzles 25 and the combustion air nozzles 26 are each arranged to extend in the radial direction in the same fashion and project beyond the wall of the combustion chamber 3 into the interior thereof. In that arrangement the nozzles 25, 26 each having an inclinedly downwardly, radially inwardly extending end 25' and 26' respectively.

Fuel of widely varying nature can be continuously supplied to the combustion chamber 3 by way of the fuel nozzles 25. When the apparatus is used in a blast furnace or direct reducing installation, it is possible for example to burn waste gas which is produced in that case. It is also possible however to burn liquid fuels, fine-grain coal, charcoal or biomaterial. The combustion air is pre-heated in the air preheater 13 and from there is passed to the combustion chamber 3 by way of a combustion air conduit 31. The conduit 31 communicates with an annular chamber 31' which is formed between an outside wall 3' of the combustion chamber 3 and an inside wall 32 which is disposed opposite thereto and at a spacing therefrom. The two walls 3' and 32 are of such a configuration as to taper in a funnel-like configuration towards the bottom of the combustion chamber 3. In order to provide that the combustion air nozzles 26 are uniformly supplied, they are each open relative to the annular chamber 31'. Due to the supply of combustion air which has already been preheated, hot combustion gases can be produced at a temperature of between about 1350° C. and 1500° C. in the combustion chamber 3. The combustion gases flow at a speed which can be predetermined in a suitable fashion, from the combustion chamber 3 into the heater 5 which they leave as an exhaust gas by way of a gas outlet 33 at its upper end at a temperature in the present embodiment of about 350° C. Those exhaust gases can possibly be used in a further preheater (not shown), for example for producing steam as a gasification agent, or for drying solid fuels, and subsequently thereto can be passed to a waste gas cleaning installation (also not shown).

In the present case the heater 5 is subdivided by five grids 34a through 34e which extend substantially horizontally and flat; in that arrangement the spacing between adjacent grids is substantially the same. The heater 5 and the combustion chamber 3 are clad with refractory material in a manner which is not shown in greater detail herein; it is also possible to use water-cooled wall elements.

In counter-flow relationship with the combustion gases which rise from the combustion chamber 3 into the heater 5, heat carrier particles are supplied by way of a distributor 41 which is arranged beneath the gas outlet 33 and above the grid 34e. The particles which comprise a hard, substantially abrasion-resistant material, for example aluminium oxide, are fed to the distributor by way of a conveyor conduit 43 which extends substantially in a vertical direction from the bottom region of the support frame 17. The particles are fed to the conveyor conduit 43 by a pneumatic conveyor device 40; the latter can be supplied with compressed air by a blower (not shown), by way of a compressed air connection 54. It is also possible for the particles to be conveyed to the distributor for example by way of support belts provided with conveyor buckets, or by way of a screw conveyor.

The heater 5 is substantially uniformly supplied with particles by way of a distributor 41 having a plurality of distributor pipes or plates which extend in a star-like configuration. The particles are of a diameter in the range of between about 0.5 mm and 3 mm and are of substantially spherical shape, wherein by a suitable grading operation it is optionally possible to ensure that the proportion of particles which are not of a spherical shape but which are flat is small. In order to achieve a high level of efficiency in regard to the supply of heat from the combustion gas to the particles, the particles are fluidised by the combustion gas above one or more of the grids 34a through 34e in such a way that thin fluidised beds of a height of about 100 mm are formed above the grids. Ball-shaped particles are particularly suitable for the formation of thin fluidised beds of that kind. The intimate mixing effect between the particles and the combustion gas, which takes place in the thin fluidised beds above the grids 34a through 34e, permits good absorption of heat by the particles so that they are heated to a temperature of about 1250° C. when involving a short residence time of about between 1 and 2 minutes per fluidised bed and with a short transit time through the heater 5, starting from a temperature of about 200° C. at which the particles are supplied by way of the distributor 41.

The particles may pass from one of the grids 34e, 34d, 34c, 34b to a respective adjacent region of the heater 5, which is defined by a subjacent grid, or from the grid 34a to the combustion chamber 3, by way of a plurality of flow transfer pipes 37 (see FIG. 5) associated with respective grids 34a through 34e. That will be described hereinafter in connection with the structure of the grids.

Further heating of the particles may occur directly in the combustion chamber 3 by the combustion gas which is produced therein and which is at a temperature of between about 1350° C. and 1500° C. The described arrangement of the fuel nozzles 25 and the combustion air 26 gives a flow of the combustion gas produced such that formed within the combustion chamber 3 is a fluidised bed in which the particles in the combustion chamber 3 are substantially completely involved. The fluidised bed formed in the combustion chamber 3 corresponds to a seething or bubbling fluidised bed in which the density thereof is comparatively low and in which the particles are in rapid motion. Besides providing for a good transfer of heat between the combustion gases and the particles, the fluidised bed produced in the combustion chamber 3 also provides that the particles prevent ash from clinging or being deposited, as is otherwise possible, by virtue of contact with the fuel nozzles 25, the combustion air nozzles 26 and the wall 3' of the combustion chamber.

In order for the thin fluidised beds to be formed above the grids 34a through 34e in the heater 5, it is necessary for them to have a substantially flat surface. In the upper and thus colder region of the heater 5, it is possible to use a grid 34e consisting of high-grade steel, which has a sufficiently high level of thermal resistance and resistance to wear. In the lower region of the heater 5 with temperatures of up to about 1250° C., it is advantageous for example for the grids 34a, 34b to be formed from a heat-resistant ceramic material. In that respect, it has been found advantageous to use hexagonal ceramic elements which are supported against each other and which are prestressed relative to each other and generally relative to the outside wall of the heater 5 by way of springs so that it is possible to compensate for thermal expansion effects. In that way it is possible to ensure that, even in the heated condition, the grids retain their flat shape or their horizontal positioning. Each of the elements has at least one through opening through which the combustion gas can flow.

In accordance with the invention, each of the ceramic elements is of a two-part configuration, comprising a respective support element 34, 35', 35" and 35"' (FIGS. 2 and 4) made from a ceramic material, and a respective cover element 36', 36" (FIGS. 3 and 5) associated with the support element.

Figure 4:
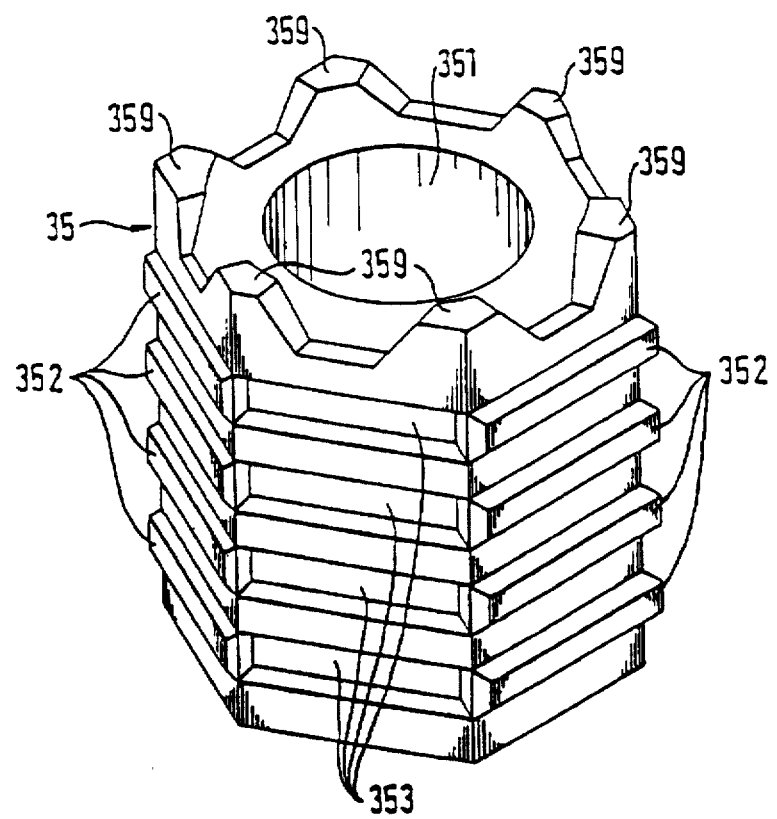
FIG. 4 shows a support element for a grid as shown in FIGS. 2 and 3.

As can be seen from FIG. 4, the support elements 35 through 35"' are of a prism-like configuration with a hexagonal base surface and a central through opening 351. For connecting adjacent support elements 35 through 35"', side walls which are alternately adjacent to each other are respectively provided with holding projections 352 and holding recesses 353 which extend substantially horizontally at respective equal spacing from each other. Side surfaces which extend inclinedly in a suitable fashion are provided on the holding projections 352 and the holding recesses 353 so that, to provide for mutual support, holding recesses 353 of a support element 35' through 35"' can receive holding projections 352 of adjacent support elements in a simple fashion while the holding projections 352 of that support element in turn engage into holding recesses 353 of adjacent support elements. In that way, the arrangement of a plurality of support elements 35' through 35"' gives the supporting configuration shown in FIG. 2 of one of the grids 34a through 34d. If the grid 34e is not formed from high-grade steel, it can be constructed in a manner corresponding to the grids 34a through 34d described herein, like moreover possibly also grids in other parts of the apparatus, such as for example the reactor 1.

Figure 2:
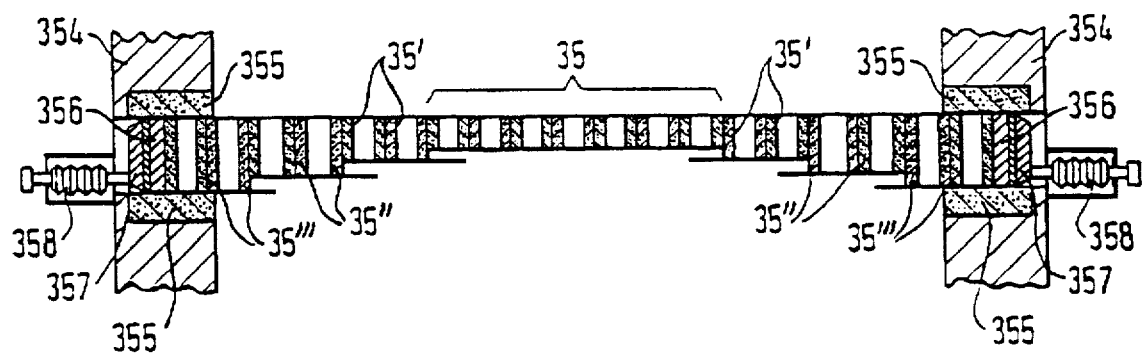
FIG. 2 is a view in longitudinal section through a grid.
Figure 3:
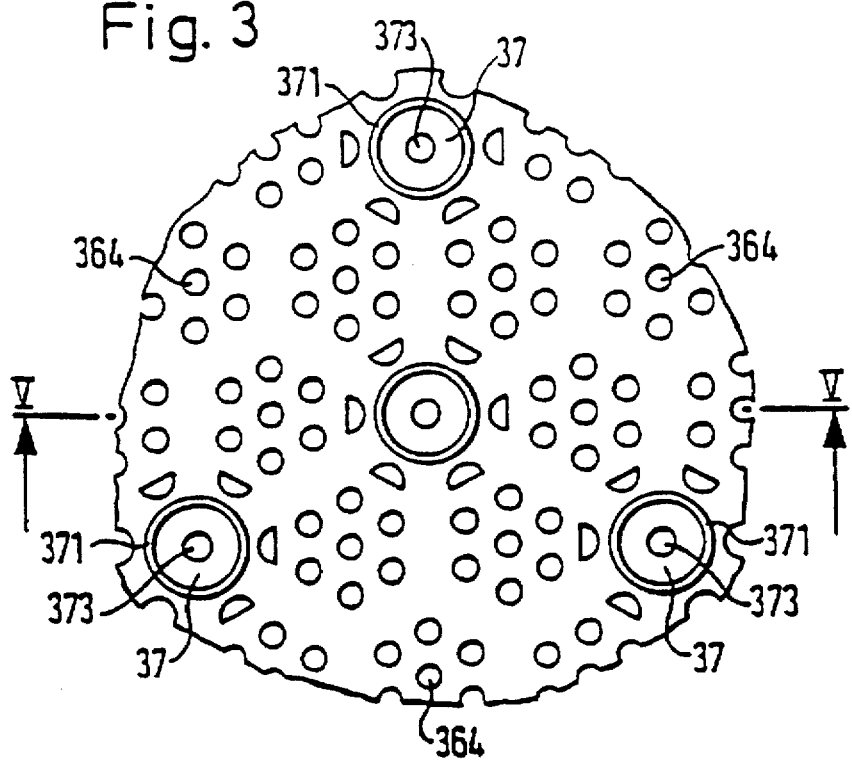
FIG. 3 is a plan view of a region of the grid shown in FIG. 2.

In that respect, as can be seen from FIG. 2, support elements of different heights are so arranged that support elements 35 of the smallest height are disposed in a central region. They are then adjoined in a radially outward direction by substantially concentric regions with support elements 35', 35" and 35"', each of heights which are increased in a step-wise configuration, wherein all support elements 35 through 35"' are so arranged that their upper end faces lie in a common plane. That arrangement of support elements 35 through 35"' of different heights gives a vault-like structure for the load-supporting part of the grids, which gives a good load-bearing performance and a reduction in weight. For the load-bearing part of the grids to be supported at a wall 354 of a container, such as for example in the present case the heater 5, the radially outwardly disposed support elements 35"' extend as shown in FIG. 2 into a receiving means in the wall 354, the receiving means being lined with refractory material 355. Adjoining the radially outward support elements 35"' are intermediate elements 356 which co-operate therewith and which in their entirety provide a substantially cylindrical outside peripheral surface. That is adjoined by steel plates 357 of a suitable shell-like configuration which are prestressed in a radially inward direction by way of springs 358 which are distributed around the periphery of the assembly at predeterminable spacings. The springs 358 may each be formed by a plurality of mutually associated diaphragm springs or by coil springs of a suitable configuration. The springs 358 load the support elements 35, 35', 35" and 35"' substantially uniformly with radially inwardly directed radial forces. Thus, mutually adjacent holding elements 35, 35', 35" and 35"' are pressed against each other, for holding projections 352 and holding recesses 353 properly to engage into each other. By virtue of the fact that the individual support elements 35, 35', 35" and 35"' are pressed against each other substantially uniformly by way of the prestressing forces of the springs 358, variations in the dimensions of the container wall 354 and also the individual support elements 35, 35', 35" and 35"', which are due to temperature differences, can be compensated in a simple and reliable fashion. That therefore ensures that fluctuations in temperature do not give rise to the formation of cracking which would otherwise occur due to local stress concentrations, while at the same time that arrangement ensures that, for example when a respective grid cools down, the cohesion between the mutually adjacent support elements 35, 35', 35" and 35"' is not reduced. That also guarantees that the grids enjoy sufficient stability in respect of shape.

The fact that the individual support elements 35 through 35"' differ from each other only in respect of their height means that it is readily possible for support elements to be made from a ceramic material, using shapes which are the same in terms of their fundamental structure. The hexagonal configuration of the support elements 35 through 35"' also makes it possible to provide through openings 351 of relatively large diameter, which results in the support elements being of a relatively small wall thickness and thus a reduction in weight. In that way it is possible for a proportion of over 50% of the total area of a grid which is constructed in that way to constitute an opening area, made up of all of the through openings 351. Accordingly, it is possible to achieve a saving in weight in the range of between 70% and 90%, relative to a rigid assembly of grids.

For a grid which is constructed in accordance with the invention from support elements 35 through 35''' and which has support elements 35 of minimum height of about 15 cm and support elements 35''' of maximum height of about 40 cm, it has been found sufficient, to provide a degree of rigidity which satisfies the relevant requirements, for a prestressing force of about 2 kP/cm$^2$ to be applied at the outside periphery by means of the springs 358. For the purposes of carrying out the process with temperature increases which occur in that situation and resulting thermal expansion effects affecting the support elements 35 through 35''', a uniformly distributed increase in the prestressing force to about 5 kP/cm$^2$ has proven to be particularly advantageous. The prestressing force is certainly below the pressure limit specified for the refractory material. As the refractory material is constantly held under a substantially uniform pressure, crack formation during cooling is very substantially prevented.

Figure 7:
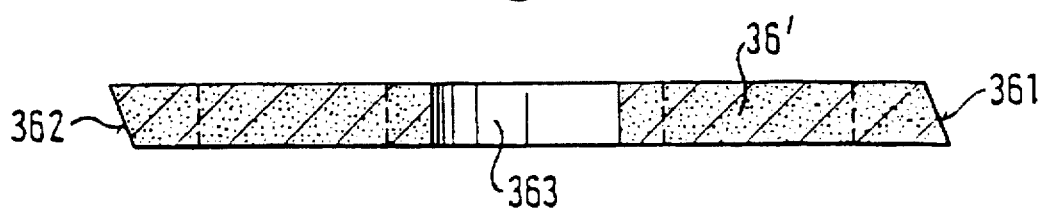
FIG. 7 is a view in longitudinal section through a cover element taken along line VII—VII in FIG. 6.

To provide the flat surface required for a grid in order for a respective fluidised bed to be formed thereon, cover elements 36', 36'' are arranged on the top side of the load-carrying part of the grid which is formed by the above-described arrangement of support elements 35 through 35'''. In that respect, associated with each of the support elements 35 through 35''' is a respective cover element 36' and 36'' respectively of the same basic hexagonal shape and size, wherein each of the cover elements 36', 36'' which are of a substantially plate-like flat configuration lies on supporting projecitons 359 provided in corner regions of the support elements 35 through 35'''. As can be seen from FIGS. 5, 6 and 7, the cover elements 36', 36'' alternately have side edges 361 and 362 which extend inclinedly at different angles of inclination. In that respect the side edges 361 form an inclined surface which is accessible from above while the side edges 362 form an inclined surface which is not accessible from above and which forms an undercut configuration. By virtue of side edges 361 and 362 of adjacent cover elements 36' and 36'' engaging into each other, that provides for mutual support and connection between the cover elements 36' and 36'' which are laid in that way on the support elements 35 through 35'''. The surface which is formed in that way by the cover elements 36' and 36'' is flat to the extent required for the formation of a fluidised bed. By virtue of the fact that the cover elements 36', 36'' are disconnected from the support elements 35 through 35'' in regard to the transmission of load-bearing forces of thermal stresses or expansion effects, the surface of a grid which is constructed in that way remains flat even when such loadings occur.

The cover elements 36' which, like the cover elements 36'' and the support elements 35 through 35''' are made from a ceramic material, are provided in the present embodiment with a central opening 363 and at a radial spacing therefrom with six further through openings 364 of substantially the same diameter.

Figure 5:
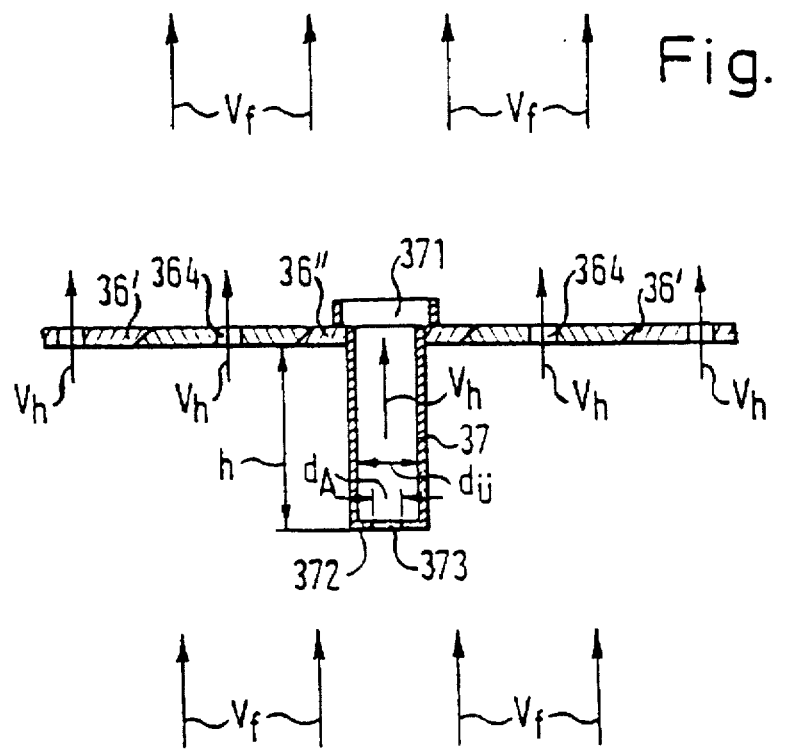
FIG. 5 is a view in longitudinal section through an arrangement of cover elements for a grid, taken along line V—V in FIG. 3.
Figure 6:
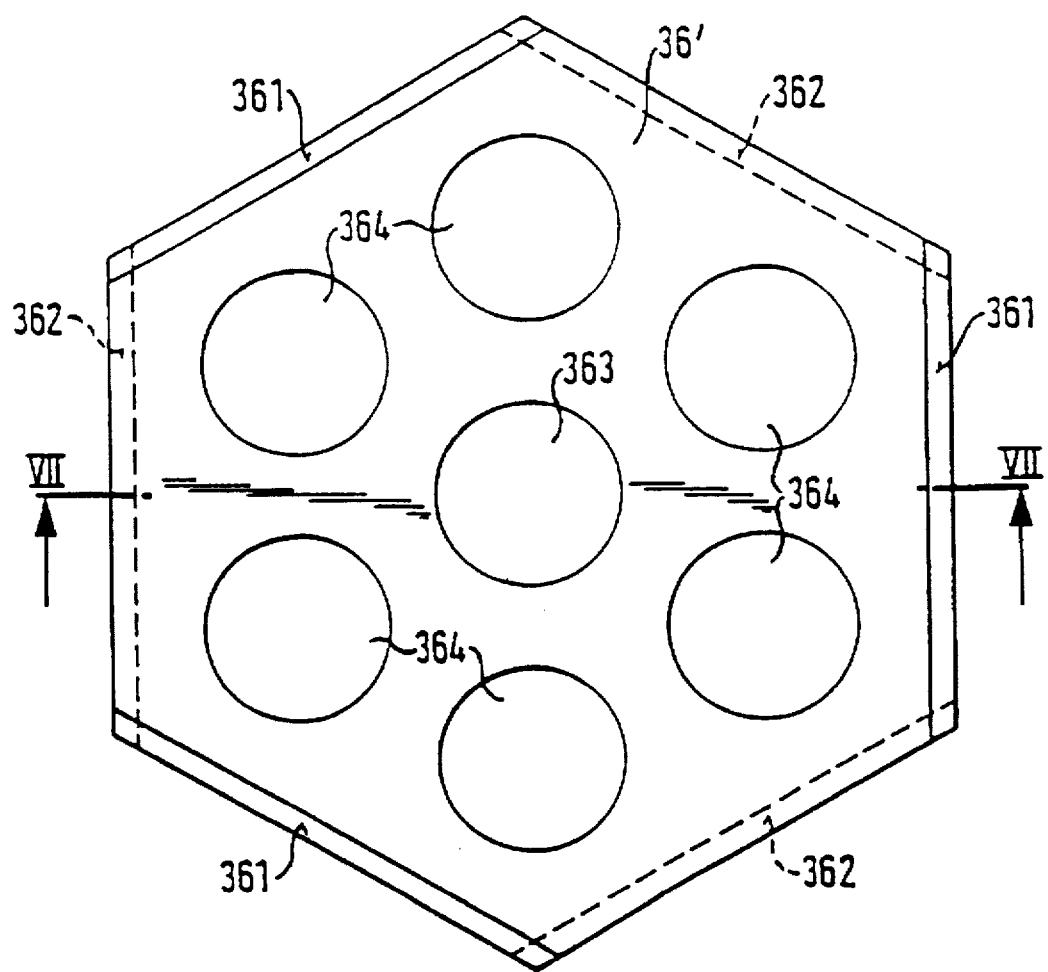
FIG. 6 is a plan view of a cover element.

As shown in FIG. 5, cover elements 36'' are respectively fixedly connected to a flow transfer pipe 37 which is passed through a central through opening 363. Cover elements 36'' of that kind which moreover like the cover elements 36' may have through openings 364 are arranged alternately with cover elements 36' in such a way that for example each fifth to tenth cover element is a cover element 36'' which is connected to a flow transfer pipe 37. The weight of the pipes 37 provides for adequate anchoring of the cover elements 36'' and overall the arrangement of cover elements 36' and 36'' is adequately anchored by way of the side edges 361 and 362 which overlap each other. Adaptation of flow transfer pipes 37 to a desired rate or particle throughput can be effected in a simple manner by cover elements 36', 36'' being replaced by those in which the flow transfer pipes 37 are each of the required diameter and height.

Through the opening 351 in the support elements 35 through 35''' and the openings 363 and 364 associated with the openings 351 in the cover element 36', and the openings 364 in the cover elements 36'', gas which is required to build up a fluidised bed with particles passes into the region above a grid which is constructed in that way. In the case of the grids 34a through 34d of the heater 5, combustion gas flows out of the combustion chamber 3 by way of the through openings 351 and 363 as well as 364 into the region above the respective grid. In that situation the speed of the combustion gases $V_f$ is of a value which is sufficient to hold the particles supplied by way of the distributor 41 in a fluidised bed in a high state of turbulence; in that case, a fluidised bed is formed by such a movement of the particles above each of the grids 34a through 34d. Particle transport from a region above a grid into a region beneath the grid takes place by way of the flow transfer pipes 37 which are associated with the cover elements 36''. As can be seen from FIG. 5, each flow transfer pipe 37 has an entry region 371 of larger diameter, which is disposed above the cover element 36'' and thus the grid. The end of the flow transfer pipe 37 which is opposite the entry region 371 has an end wall 372 with a central discharge opening 373. The discharge opening 373 is thus of a diameter $d_A$ which is reduced in comparison with the entry region 371 and also the diameter $d_\pi$ of the flow transfer pipe 37.

As described hereinafter in relation to a grid, particles can pass through the flow transfer pipes 37 or the discharge openings 373, through the grid or from a region above the grid into a region beneath the grid. That applies in a corresponding manner to all grids which are made up in a corresponding fashion from support elements 35 through 35''' and cover elements 36', 36''.

Within a fluidised bed the particles are of a density which generally exceeds that of the gas flowing through the grid in a counter-flow relationship to the particles, by a factor of 1000 times. In the present process, particles move through the openings 363 and 364 of the cover elements 36' and the openings 364 and the respectively associated flow transfer pipe 37 of the cover elements 36'' at a flow rate in the range of between about 200 and 600 kg/cm$^2$/h, the diameter of the openings 363 and 364 being in the region of between about 20 mm and 80 mm. The flow rate of the fluidisation gas is substantially lower and is in the range of between 3 and 50 kg/cm$^2$/h and depends on the pressure, temperature and respective kind of gasification procedure being performed. The gas flow which passes through the openings 363 and 364 in the grids can result in substantially no particles being able to pass in counter-flow relationship to the gas through the grid.

Figure 8:
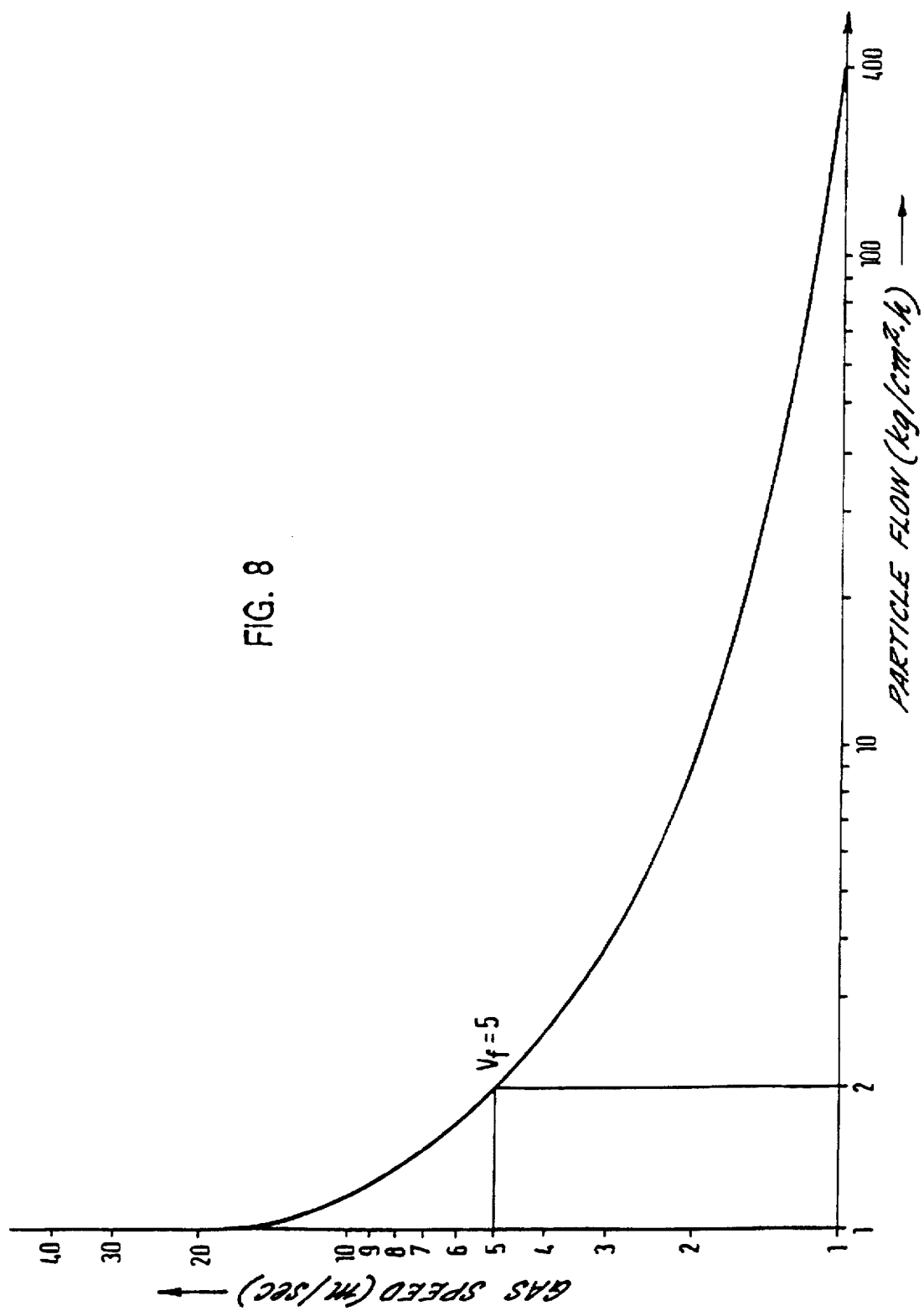
FIG. 8 is a diagram showing a throughflow of particles through a grid in dependence on a gas speed.

The diagram shown in FIG. 8 illustrates the relationship between the gas speed and the particle flow for diameters of the openings 363 and 364 of about 60 mm, and an overall transmission range for the grid of about 25% for particles with a diameter of about 1 mm. At a high gas speed $V_h$ of more than 5 m/s which corresponds to the flow speed of the particles $V_p$ there is only a low degree of flow of particles through the grid. If therefore the gas speed exceeds the particle flow speed, only a small proportion of particles passes through the grid, which is to be attributed to the turbulence effects caused in the gas flow by the particle flow. For a self-cleaning effect for the openings 363 and 364 in the grid, in relation to ash which is produced and the like, it is desirable for the gas speed $V_h$ within the openings 363 and 364 to be substantially above the particle flow speed $V_f$. By selecting a suitable fluidization speed in the reactor 1 and/or the heater 5 and/or the air preheater 13, the self-cleaning action in respect to the vigorously moving particles is applied to the particles themselves and to the surface of the grids and internal surfaces of the respective vessels. Moreover, for an effective heat exchange effect relative to the particles and for the formation of a fluidised bed, it is desirable for the gas speed $V_r$ above a grid to be of a value which is close to the particle speed $V_f$. As mentioned, high speeds $V_h$ of the gas in the openings 363 and 364 give only a low flow of particles through those openings. Portions of a grid which surround entry regions 371 of flow transfer pipes 37 form regions with a comparatively calm flow within the fluidised bed, being regions in which the gas speed is lower than the gas speed $V_r$ outside those regions. The result of this is that the particle density can rise in those regions. The ratio of the cross-sectional area of the discharge opening 373 to that of the flow transfer pipe 37 substantially corresponds to the ratio between the total open area of the grid, to the total area thereof. That means that the flow speed within a flow transfer pipe substantially corresponds to the gas speed $V_r$, in a region above the grid.

Since, as stated, the particle density in the entry region 371 is slightly greater than in the other regions of the fluidised bed, a larger amount of particles passes into the entry regions 371 and thus the flow transfer pipes 37, than is the case of the other openings 363 and 364 in the grid. Although the gas flow through the discharge opening 373 in each case is sufficient to displace particles out of a flow transfer pipe 37, the energy which is required for that purpose and which can be detected as a pressure difference is increased. The result of this is that a part of the gas is deflected in the manner of a by-pass from the entry opening 373 to adjacent openings 363, 364 of a grid. That procedure is irreversible and continues until the gas flow within a flow transfer pipe 37 falls below a value which is necessary to fluidise the particles. In that case the fluidised bed which is formed within a flow transfer pipe 37 collapses, which results in an interruption in the flow of gas into the flow transfer pipe 37. The particles then pass through the discharge opening 373 at a delivery rate which is proportional to the area of the discharge opening 373. As particles can pass out of the flow transfer pipe 37 by way of a discharge opening 373 more quickly than on the other hand particles can pass into the flow transfer pipe 37 by way of the entry opening 371, the particles which have collected within the flow transfer pipe 37 pass towards the exterior. Gas can now in turn flow into the flow transfer pipe 37, which results in fluidisation of the particles which have remained therein and the particles which freshly pass into the flow transfer pipe 37, more specifically until that procedure is again reversed. For efficient operation it is advantageous for the length h in millimeters of the flow transfer pipe 37, by which the pipe 37 projects downwardly out of the grid, to be equal to or greater than the quotient between the maximum pressure drop of the gas in millimeters of water column, which is acceptable for the grid, and the density of the particles in relation to surface area, in g/cm². The diameter of the discharge opening 373 is advantageously greater than 60 times the diameter of the particles. That prevents a mechanical bridge from being able to be formed. In order to provide for the formation of a uniform fluidised bed and uniform feed for the flow transfer pipes 37, even when using grids of large diameter, it is advantageous for a plurality of flow transfer pipes 37 to be disposed at substantially the same spacing. The total cross-sectional area of all discharge openings 373, for the advantageous production of fluidised beds, should exceed 4 times the area which would be required solely on the basis of the particle flow.

Particles can move from the fluidised bed formed in the combustion chamber 3 through the flow transfer pipe 7 into the upper region of the reactor 1. The vertical arrangement of the flow transfer pipe 7 and the combustion chamber 3 above the reactor 1 means that the movement of the particles through the flow transfer pipe 7 is assisted by their weight. A corresponding point applies in regard to the movement of the particles through the heater 5 and the preheater 13. As shown in FIG. 9, the flow transfer pipe 7 is preferably arranged in a central region of the combustion chamber 3. Instead of that arrangement or if necessary in addition thereto however it is also possible for a flow transfer pipe 7' to be arranged in an edge region of the combustion chamber 3, as is also shown in FIG. 9 in broken lines. The structure and mode of operation of the flow transfer pipe 7' are substantially the same as those of the flow transfer pipe 7 and the description relating to the flow transfer pipe 7 therefore correspondingly applies to the flow transfer pipe 7'. The centrally disposed flow transfer pipe 7 has an inlet opening 42 of a funnel-like configuration, which is arranged in the region of the fuel nozzles 25, more specifically at a small spacing above same. In the case of a laterally disposed flow transfer pipe 7', a region 42' of the inlet opening is enlarged in a funnel-like configuration.

Provided in the bottom of the combustion chamber are recessed regions 44, 44' which are in part enlarged upwardly in a funnel-like configuration and in which, besides ash which is produced in the combustion chamber, there can accumulate agglomerated particles which cling to each other for example due to a sintering effect or particles which are contaminated with ash. Adjoining the recessed regions 44, 44' are drainpipes 45, 45' which are only incompletely illustrated and which can be closed in a manner not shown in the drawing. Particles which have accumulated in the recessed regions 44, 44' can be removed from the particle circuit by way of the drainpipes 45, 45'. That ensures that the particle circuit and the formation of fluidised beds within that circuit is not adversely affected by agglomerated particles or ash-contaminated particles. Otherwise particles of that kind could for example result in the grids or the flow transfer pipe 7 being at least partially blocked.

The flow transfer pipe 7 extends substantially in a vertical direction and its end which has an outlet opening 46 projects into the upper region of the reactor 1. Associated with the outlet opening 46 is a distributor device for the particles, and adjacent thereto at a spacing therefrom, is an orifice plate 47 with an opening 47', the diameter of which is smaller than that of the outlet opening 46. Associated with the side of the plate 47, which is remote from the outlet opening 46, there is also a distributor plate 48 which acts as a baffle plate.

A control nozzle 49 is associated with a region of the flow transfer pipe 7, which is adjacent to the outlet opening 46. The control nozzle 49 is formed by openings which are distributed around the periphery of the flow transfer pipe. The openings communicate with a control gas conduit 51 by way of a ring passage 50.

In a corresponding fashion, an orifice plate 47", a distributor plate 48', a control nozzle 49' and a ring passage 50' may be associated with the flow transfer pipe 7'.

Control gas which is supplied upon requirement by way of the control gas conduit 51 flows by way of the control nozzle 49 into the end region of the flow transfer pipe 7 which is adjacent to the outlet opening 46, and there produces an injector effect, by virtue of which the throughput speed of particles in the flow transfer pipe 7 is increased. By a variation in the throughput speed of the particles which pass through the flow transfer pipe 7 into the reactor 1, it is easily possible to influence the supply of heat to the reactor 1, and thus the operating procedure being performed. The control gas used may be an inert gas such as for example nitrogen.

Particles passing through the flow transfer pipe 7 from the combustion chamber 3 into the reactor 1, after issuing by way of the outlet opening 46, are firstly partly deflected by the orifice plate 47. A main component passes through the opening 47' to the distributor plate 48. The remaining component is already deflected in the region between the outlet opening 46 and the orifice plate 47. Due to that deflection of a small component of the particles supplied and the impingement of the main component on the distributor plate 48, the particles are substantially uniformly distributed in the upper region of the reactor 1. That provides a necessary condition for effective heat exchange within the reactor 1.

The throughput of particles through the flow transfer pipe 7 is also such that the particles in the flow transfer pipe 7 form an effective seal relative to the product gas which is generated in the reactor 1. That effectively prevents product gas from passing through into the combustion chamber 3, without the need for the provision and control of shut-off members, for example a double-acting valve. The sealing action which is produced by the flow of particles through the flow transfer pipe 7 occurs even when an increased pressure obtains in the reactor 1, in comparison with the combustion chamber 3. An increased pressure of that kind is advantageous for safety reasons for it is thus possible to ensure that air or combustion gas cannot pass into the reactor 1 either form the air preheater 13 which is connected to the reactor 1 by way of a return conduit 15 for particles, or from the combustion chamber 3.

As shown in FIG. 10, the feed chamber 11 which is arranged beneath the side of the reactor 1 which is remote from the flow transfer pipe 7 is subdivided by a porous partition 52 into a lower chamber 53 and an upper chamber 55. The porous partition 52 may be formed by a steel plate 57 provided with a plurality of through openings, and a wire mesh layer 59 which is disposed thereon. The lower chamber 53 has a connection 61 for the supply of a gas as a conveyor or fluidisation gas. That gas may be for example an inert gas; however it is also advantageously possible for a gasification agent which is used for the gasification effect to be fed to the lower chamber 53 as the conveyor gas, with the exception of blast furnace gas. The upper chamber 55 is fed with gasification substance, possibly together with a conveyor gas, by way of a connection 63 in a manner which is not illustrated herein. The gasification substance is picked up in the manner of a fluidised bed in the upper chamber 55 by the gas flowing out of the lower chamber 53 by way of the porous partition 51. In a comparable fashion, liquid gasification substances and/or gases to be reformed can be fed directly to the reactor 1 by way of a suitable arrangement.

Gasification substances which are picked up in the upper chamber 55 in the manner of a fluidized bed are passed to the lower region of the reactor 1 by way of a plurality of feed pipes 9. So that the reactor 1 is supplied by way of the feed pipes 9 with gasification substances which are substantially uniformly distributed in the conveyor gas, the ends of the feed pipes 9 which project into the upper chamber 55 are each closed by an end closure portion 65 while a lateral inlet opening 67 is formed on a tubular connection which extends transversely relative to the longitudinal direction of the feed pipe 9. Associated with the outlet openings 69 of the feed pipes 9, at the reactor end, are covers 71 which are disposed at a spacing from the outlet openings 69 and which prevent particles from being able to pass by way of the outlet opening 69 into the feed pipes 9 and thus into the feed chamber 11.

Starting from a region which is disposed outside the feed chamber 11 to a region adjacent to the outlet openings 69, associated with one or more of the feed pipes 9 are outer pipes 73 which enclose the feed pipes 9 and which at their lower ends are each closed off relative to the associated feed pipe 9 and which each have an inlet connection 75 which extends transversely to the longitudinal direction of the outer pipe 73 and also the feed pipe 9. By way of the inlet connections 75, gasification agents such as for example water, steam or $CO_2$-bearing gases or gases to be reformed can be passed to the reactor 1 by way of the intermediate space formed between the feed pipe 9 and the associated outer pipe 73.

Gasification agents and gasification substances or gases to be reformed, which are passed to the lower region of the reactor 1 in that way, flow within the reactor 1 in the direction of the upper region thereof where, as described, particles heated in the heater 5 and the combustion chamber 3 are supplied by way of the flow transfer pipe 7. Those particles which are distributed by the orifice plate 47 and the distributor plate 48 in the upper region of the reactor 1 pass in counter-flow relationship to the gases supplied to the reactor 1 into the lower region, which has an inclined wall 77, of the reactor 1. The lowest location thereof forms a collecting region 79 for the particles. The cooled particles which accumulate at the bottom of the reactor 1 pass into the collecting region 79, possibly after slipping down along the inclined wall 77; connected to the collecting region 79 is the return conduit 15 by way of which the particles are fed to the air preheater 13.

The particles which are passed in counter-flow relationship to the gas fed to the reactor 1, and also the product gas generated within the reactor 1, are picked up in the gas in the manner of a fluidised bed. The resulting intimate mixing of the particles with the gas means that the heat exchange effect between the particles and the gas takes place with a high level of efficiency. The product gas which, as described, is prevented from passing into the combustion chamber 3 by the particles in the flow transfer pipe 7 leaves the upper region of the reactor through a product gas conduit 81 which issues from the upper region of the reactor 1.

The good heat exchange effect within the reactor 1 ensures that the fine-grain solid or liquid gasification substances supplied and/or gas to be reformed can react together with the gasification agent in order to produce product gas in accordance with one of the following reactions:

$$C+CO_2=2CO$$

$$C+H_2O=CO+H_2$$

$$CH_4+H_2O=CO+3H_2$$

$$CH_4+CO_2=2CO+2H_2$$

$$CO+H_2O=CO_2+H_2$$

$$C+2H_2=CH_4$$

The fact that solid gasification substances are already well mixed in the feed chamber 11 with a conveyor gas which possibly corresponds to the gasification agent and in that fashion pass into the reactor 1 by way of the feed pipes 9, permits good contact with the particles and thus provides for an effective heat exchange effect. That gives short reaction times for the chemical reactions which take place within the reactor 1. The reaction times are dependent on the grain size of the gasification substance and for example for the gasification of coal of a grain size of about 200 Mesh (corresponding to 74 μm), the reaction times are between about 0.1 and 0.2 second. The chemical reactions stop at a lower temperature of between about 800° C. and 900° C.; the excess heat which is contained at those temperatures in the particles which accumulate in the collecting region 79 is passed to the air preheater 13 by way of the return conduit 15. However it may also be used in a modified closed circuit for the particles, for example for generating steam, for preheating air for a blast furnace or for drying for example biomaterial which is to be burnt in the combustion chamber 3.

In order to precipitate the sulphur component when using a gasification substance which contains a high sulphur content, it is additionally possible to introduce into the reactor 1, in a manner which is not shown herein, fine-grain lime which binds the sulphur component, forming slag. The slag may be discharged for example by and with the particles out of the reactor 1 and, before the particles are returned to the conveyor conduit 43, the slag components such as any discharged ash components may be separated off, for example by sieving.

In accordance with the invention it is also possible for an ash component which is produced in the combustion chamber, possibly together with ash-contaminated particles, to be discharged from the combustion chamber 3 by way of the drainpipes 45, 45'. That ensures a trouble-free operating procedure, even when using fuels with a more substantial ash component. In that connection, within the particle circuit, the main proportion of the particles is passed into the reactor 1 by way of the flow transfer pipe 7, as described above. For the purposes of ash removal, with same a small proportion of the particles passes into the recessed regions 44, 44', outside the particle circuit. That proportion may be removed by way of the drainpipes 45, 45'. After those particles have been separated from the ash or agglomerated or damaged particles have been separated off, they can be returned to the particle circuit in a manner not shown herein.

The process according to the invention has been carried out with the following parameters, for the gasification of fine-grain solid gasification substances. The weight data and the volume data are related to a volume of the product gas generated of 1 Nm$^3$. Accordingly the weight of the particles flowing within the circuit is 7.5 kg. The particles are fed to the heater 5 by way of the distributor 41 at a temperature of about 200° C. Fuel is fed to the combustion chamber 3 by way of the fuel nozzles 25 at a pressure of 0.65 mWc and a temperature of 25° C.; in that situation an amount of heat including air preheating of 3.0 Mcal is supplied. The air which is supplied by way of the combustion air nozzles 26 has been preheated to a temperature of 700° C. in the air preheater 13 and is supplied under a pressure of 0.65 mWc. The particles which are heated in the heater 5 and the combustion chamber 3 leave the combustion chamber 3 by way of the flow transfer pipe 7 at a temperature of about 1250° C.

By way of the feed chamber 11, the reactor 1 is supplied with a gasification substance of a specific gravity of 0.31 kg, at a temperature of 30° C. and under a pressure of 8.5 mWc. Gasification agent of a specific gravity of 0.34 kg and at a temperature of 140° C. is supplied under the same pressure. The product gas generated in the reactor with a specific volume of 1.0 Nm$^3$ leaves the reactor 1 at a temperature of 1200° C. and a pressure of 7.5 mWc. The particles which are conveyed from the reactor 1 into the air preheater 13 by way of the return conduit 15 are at a temperature of about 800° C. Air which is passed to the air preheater 13 has a specific volume of 6.5 Nm$^3$, a temperature of about 50° C. and a pressure of 0.95 mWc. The air which is preheated in the preheater 13 leaves it at a temperature of about 700° C. and a pressure of 0.75 mWc in order to be fed to the combustion air nozzles 26 by way of the combustion air conduit 31. In that situation the particles are cooled in the air preheater 13 to a temperature of about 200° C. and from there they are conveyed back into the heater 5 by way of the conveyor conduit 43 and the distributor 41.

In the above-described operating procedure saturated steam is used as the gasification agent. In regard to the consumption of fuel, only the amount of heat is specified as, as described above, various fuels may be used. A CO and H$_2$ proportion of about 95% by volume can be achieved for the product gas which is generated under those conditions.

We claim:

1. A high temperature heat exchanger for a heat exchange between solid particles and a fluidizing agent in a fluidized bed, said heat exchanger comprising a vessel having at least one grid, said grid having through holes for supplying fluidizing gas, said grid being formed from substantially hexagonal ceramic elements, each of which comprises a support element and a plate-like cover element which lies thereon, wherein said support elements are alternately provided at adjacent sides with substantially horizontally extending holding projections and holding recesses for cooperating with holding recesses and holding projections respectively on adjacent support elements.

2. A heat exchanger as set forth in claim 1 wherein said support elements of said grid, starting from centrally arranged support elements of small height, support elements of heights which increase in a stepwise fashion are arranged in a radially outward direction to form a vaulted shape grid at its underside.

3. A heat exchanger as set forth in claim 1 further comprising springs which are fixed on the vessel side for prestressing said support elements.

4. A heat exchanger as set forth in claim 1 wherein said support elements have a through bore.

5. A heat exchanger as set forth in claim 1 wherein said cover elements have side edges which alternately extend inclinedly at different angles of inclination, for the cover elements to be supported against each other.

6. A heat exchanger as set forth in claim 1 wherein said cover elements have a number of uniformly distributed through openings.

7. A heat exchanger as set forth in claim 1 further comprising a flow transfer pipe of predetermined diameter and predetermined height for particle transport and being passed through a central through opening of said cover elements.

8. An apparatus for gasifying liquid and/or fine-grain solid gasification substances and/or for reforming a gas, adding a gasification agent, said apparatus comprising:
 a heater, a combustion chamber and a reaction each arranged in substantially vertical direction;
 said heater arranged above said combustion chamber and directly adjoining same, said heater comprising a high temperature heat exchanger according to claim 1 and a distributor in the upper region of said heater for distributing heat carrier particles;

fuel nozzles distributed over the periphery of said combustion chamber in the lower region thereof;

combustion air nozzles distributed over the periphery of said combustion chamber beneath said fuel nozzles;

a flow transfer pipe connected between said combustion chamber and said reactor, said flow transfer pipe including an inlet opening being arranged in the region of said fuel nozzles and an outlet arranged in the upper region of said reactor; and a distributor device associated with the outlet opening of the flow transfer pipe, adjacent and at a spacing from the outlet opening, for distributing the particles.

9. An apparatus as set forth in claim 8 wherein said distributor device comprises an orifice plate arranged adjacent the outlet opening of said flow transfer pipe and a distributor plate which can be acted upon by way of the outlet opening or the orifice plate.

10. An apparatus as set forth in claim 8 further comprising at least one control nozzle connected to a control gas conduit, and wherein said at least one control nozzle is associated with a region of said flow transfer pipe which is adjacent to the outlet opening thereof.

11. An apparatus as set forth in claim 8 further comprising a feed chamber associated with said reactor and which is connected thereto by way of at least one feed conduit, wherein said feed chamber comprises a lower chamber with a connecting conduit for a conveyor gas and an upper chamber which is arranged above the lower chamber and which is separated therefrom by a porous partition, and wherein the upper chamber of said feed chamber has a connecting conduit for a gasification substance.

12. An apparatus as set forth in claim 11 further comprising a feed pipe including an end closure at the end which extends into the upper chamber of the feed chamber and a lateral inlet opening and a cover means arranged at a spacing from an outlet opening at the reactor side.

13. An apparatus as set forth in claim 12 further comprising at least one feed conduit for gasification agent being formed by an outer pipe which encases said feed pipe.

14. An apparatus as set forth in claim 8 further comprising a substantially vertically disposed air preheater for preheating combustion air for said combustion chamber, an upper region of said air preheater being connected to the lower region of said reactor by way of a return conduit and a lower region of said air preheater being connected to said heater by way of a conveyor conduit.

15. An apparatus as set forth in claim 8 wherein said combustion chamber bottom has at least one recessed region and further comprising a closable drainpipe opening into said at least one recessed region of said combustion chamber bottom.

16. An apparatus as set forth in claim 8 wherein said reactor comprises one or more grids.

17. An apparatus as set forth in claim 16 wherein said one or more grids of said heater and said reactor are formed from substantially hexagonal ceramic elements, each of which comprises a support element and a plate-like cover element which lies thereon.

* * * * *

UNITED STATES PATENT AND TRADEMARK OFFICE
CERTIFICATE OF CORRECTION

PATENT NO.   :   5,730,763
DATED        :   March 24, 1998
INVENTOR(S) :   Manulescu et al.

It is certified that error appears in the above-identified patent and that said Letters Patent is hereby corrected as shown below:

On the cover, after the Related U.S. Application Data, please insert -- Foreign Application Priority Data, Sept. 11, 1990 [DE] Germany .......40 28 853.6 --.

Column 15, line 38, "form" should be -- from --.

Signed and Sealed this

Third Day of November, 1998

Attest:

BRUCE LEHMAN

Attesting Officer

Commissioner of Patents and Trademarks